(No Model.)

A. J. HARRELL.
NUT LOCK.

No. 570,551. Patented Nov. 3, 1896.

Witnesses:

Inventor
A. J. Harrell
By James J. Sheehy
Attorney

UNITED STATES PATENT OFFICE.

ANDREW J. HARRELL, OF NEW ORLEANS, LOUISIANA.

NUT-LOCK.

SPECIFICATION forming part of Letters Patent No. 570,551, dated November 3, 1896.

Application filed March 12, 1896. Serial No. 582,920. (No model.)

*To all whom it may concern:*

Be it known that I, ANDREW J. HARRELL, a citizen of the United States, residing at New Orleans, in the parish of Orleans and State of Louisiana, have invented certain new and useful Improvements in Nut-Locks; and I do declare the following to be a full, clear, and exact description of the invention, such as will enable others skilled in the art to which it appertains to make and use the same.

This invention relates to improvements in devices for locking nuts to bolts, and is more particularly adapted for use on railways and in bridge building where members are united; and the novelty and advantages will appear from the following description and claims when taken in conjunction with the accompanying drawings, in which—

Figure 1:
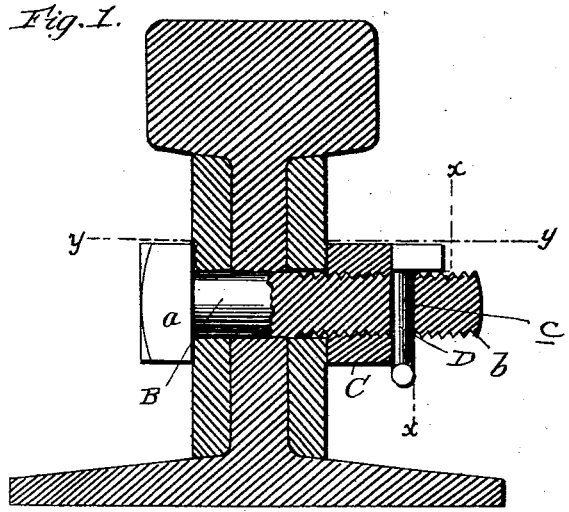
Figure 2:
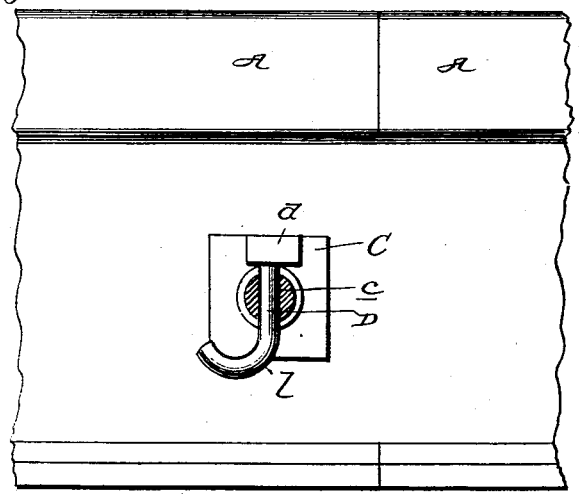
Figure 3:
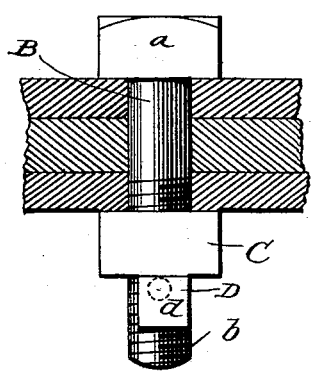
Figure 4:
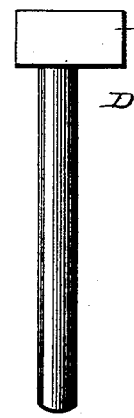
Figure 5:
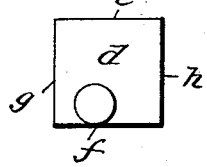

Figure 1 is a cross-sectional view of a railway-rail with my improvements applied, and partly in section. Fig. 2 is a sectional view taken on the line $x\ x$ of Fig. 1. Fig. 3 is a sectional view taken on the line $y\ y$ of Fig. 1. Fig. 4 is a detail view of my improved pin or key removed, and Fig. 5 is an inverted plan view of the same.

Referring by letter to said drawings, A indicates two abutting rails of a railway-track and which may be united by fish-plates of the usual or any approved construction.

B indicates a bolt which is provided with the usual head $a$ at one end and threaded for a sufficient distance at its opposite end, as shown at $b$. So far the bolt may be of the ordinary construction. At a suitable point in the threaded portion I provide a transverse hole $c$, and which hole may be formed in the stage of manufacture of the bolt or afterward, according to the fancy or dictation of the manufacturer.

C indicates a tap or nut, which may be also of the form usually employed.

D indicates my improved key or pin. This pin or key is of a sufficient height and of a diameter according to the bore of the hole or aperture in the bolt B. The pin is provided with a head which is peculiarly disposed with respect to the stem or shank, and is of an angular configuration in outline. The head $d$, which I have shown, has four flat sides, although more or less may be employed. The side $f$ is nearest to the stem or axial center thereof; the side $g$ next; the side $h$ next, and the side $i$ farthest from the axial center of the stem or bolt; so that I have a pin or key which may be turned in its bearing to secure and prevent a nut from turning on the bolt while held at varying distances with respect to its stem or the axial center thereof. It is obvious that the head may be provided with more or less flat sides without departing from the gist of the invention.

In operation, after two rails or other devices have been brought together and the securing-plates adjusted, by passing the bolts through the holes therein and turning up the nuts to the point desired, the pins or keys are then dropped into the holes of the bolts and turned so as to bring the proper side of the head against the fish or other plates, as the case may be, when the parts will be securely locked in position. To prevent the keys or pins from jarring out or becoming displaced, I prefer, after seating them, to give them a slight bend, as shown at 1.

Having described my invention, what I claim, and desire to secure by Letters Patent, is—

The combination with a bolt having a transverse hole in its stem; of a tap or nut, and a pin or key having a flexible stem and an integral head with flat sides, the sides being disposed at various distances from the axial point of the pin, whereby the nut may be locked at different points on the bolt, substantially as and for the purpose set forth.

In testimony whereof I affix my signature in presence of two witnesses.

ANDREW J. HARRELL.

Witnesses:
S. ROBINSON,
JOHN KEARNEY.